United States Patent [19]

Hagerty

[11] Patent Number: 5,427,286

[45] Date of Patent: Jun. 27, 1995

[54] BICYCLE RACK FOR A PICKUP TRUCK

[76] Inventor: Thomas P. Hagerty, 809 Nevada, St. Paul, Minn. 55106

[21] Appl. No.: 295,554

[22] Filed: Aug. 25, 1994

[51] Int. Cl.⁶ .............................................. B60R 9/10
[52] U.S. Cl. ...................... 224/42.03 B; 224/42.45 R; 211/18
[58] Field of Search ................. 224/42.03 B, 324, 321, 224/322, 323, 42.12, 42.13, 42.45 R; 211/5, 17-24

[56] References Cited

U.S. PATENT DOCUMENTS

| 653,386 | 7/1900 | Hunter | 211/19 |
|---|---|---|---|
| 3,893,568 | 7/1975 | Lile | 224/42.45 R |
| 3,912,139 | 10/1975 | Bowman | 224/42.03 B |
| 3,981,491 | 9/1976 | Snyder | 211/22 |
| 4,057,182 | 11/1977 | Kolkhorst et al. | 224/45.45 R |
| 4,630,990 | 12/1986 | Whiting | 224/324 |
| 4,934,572 | 6/1990 | Bowman et al. | 224/42.45 R |
| 5,037,019 | 8/1991 | Sokn | 224/42.03 B |
| 5,078,276 | 1/1992 | Rogge et al. | 211/18 |
| 5,092,504 | 3/1992 | Hannes et al. | 224/42.03 B |
| 5,127,564 | 7/1992 | Romero | 224/42.03 B |

FOREIGN PATENT DOCUMENTS

| 1127765 | 12/1956 | France | 211/17 |
|---|---|---|---|
| 4281 | of 1897 | United Kingdom | 211/18 |

Primary Examiner—Gregory M. Vidovich

[57] ABSTRACT

A bicycle rack for securing bicycles in a fixed position in a bed of a pickup truck comprising an upwardly extended and telescopically adjustable base tube having a lower end and an open upper end; wherein the base tube is coupled a bed of a pickup truck; a bicycle handle bar having two free ends; a bicycle handle bar stem having an upper end coupled to the bicycle handle bar between the free ends and a lower end coupled within the upper end of the base tube; and a securement mechanism coupled to the free ends of the bicycle handle bar for securing forks of a pair of bicycles thereto, thus placing the forks in a fixed position for enabling transport of the bicycles from one location to another.

4 Claims, 4 Drawing Sheets

# BICYCLE RACK FOR A PICKUP TRUCK

BACKGROUND OF THE INVENTION

1. Field of the Invention

The present invention relates to a bicycle rack for a pickup truck and more particularly pertains to securing bicycles in a fixed position in a bed of a pickup truck for transport from one location to another with a bicycle rack for a pickup truck.

2. Description of the Prior Art

The use of bicycle racks is known in the prior art. More specifically, bicycle racks heretofore devised and utilized for the purpose of holding bicycles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,912,139 to Bowman discloses a removable vehicle mounted cycle carrier. U.S. Pat. No. 4,770,458 to Burke et al. discloses a utility rack for pickup trucks. U.S. Pat. No. 5,014,890 to Perry discloses a bicycle rack for use in pickup trucks. U.S. Pat. No. 5,092,504 to Hannes et al. discloses a bicycle rack for pick-up trucks. U.S. Pat. No. 5,127,564 to Romero discloses a bicycle holder for pickup trucks.

While these devices fulfill their respective, particular objective and requirements, the aforementioned patents do not describe a bicycle rack for a pickup truck that uses conventional bicycle parts as components for securing bicycles within a bed of a pickup truck.

In this respect, the bicycle rack for a pickup truck according to the present invention substantially departs from the conventional concepts and designs of the prior art, and in doing so provides an apparatus primarily developed for the purpose of securing bicycles in a fixed position in a bed of a pickup truck for transport from one location to another.

Therefore, it can be appreciated that there exists a continuing need for new and improved bicycle rack for a pickup truck which can be used for securing bicycles in a fixed position in a bed of a pickup truck for transport from one location to another. In this regard, the present invention substantially fulfills this need.

SUMMARY OF THE INVENTION

In the view of the foregoing disadvantages inherent in the known types of bicycle racks now present in the prior art, the present invention provides an improved bicycle rack for a pickup truck. As such, the general purpose of the present invention, which will be described subsequently in greater detail, is to provide a new and improved bicycle rack for a pickup truck and method which has all the advantages of the prior art and none of the disadvantages.

To attain this, the present invention essentially comprises, in combination, a rigid and elongated base tube having a lower end, an open upper end, and an intermediate portion therebetween. A pair of rigid and spaced clamps is included. Each clamp has an elongated and u-shaped interior portion disposed around the base tube and a pair of opposed lips coupled to opposite ends of the interior portion for enabling the clamp and base tube to be secured to a bed of a pickup truck. A rigid and elongated extension tube is included and has a lower end, an open upper end, an intermediate portion therebetween, and a plurality of spaced adjustment holes disposed thereon in a linear configuration aligned with the central axis thereof and with the lower end of the extension tube slidably disposed in the upper end of the base tube. A height adjustment bolt is included and removably extended through the upper end of the base tube and slidably secured within an adjustment hole of the extension tube, thereby allowing adjustable projection of the upper end of extension tube from the lower end of base tube. A rigid and tubular bicycle handle bar is included and has a generally horizontally positioned and linear cross leg and a pair of spaced and generally U-shaped handles each having an upper end coupled to the cross leg and a lower free end positioned therebelow. A rigid bicycle handle bar stem is included and has an generally horizontal upper leg coupled to the bicycle handle bar at the midpoint of the cross leg thereof, a generally vertical lower leg slidably disposed within the upper end of the extension tube, and a generally perpendicular bend therebetween, the lower leg further having an upper bored section and a lower threaded bored section mated at an angular juncture and a threaded stem bolt disposed through the bores and threadably coupled with the lower section, whereby tightening the stem bolt causes the lower section to move upward along the angular juncture, thereby abuttedly coupling the bicycle handle bar stem with the extension tube, and loosening the stem bolt causes the lower section to move downward along the angular juncture, thereby decoupling the bicycle handle bar stem from the extension tube. A pair of rigid securement bolts are included. Each securement bolt is adapted for securing a fork of a bicycle to a handle. Each securement bolt has a T-shaped nut with a generally horizontal bored cross leg and an upwardly extended bored base leg. The base leg is coupled to a free end of a handle. A threaded rod is disposed within the bore of the cross leg and has a base end and a tip end extended therefrom. An adjusting nut having a threaded interior and a knurled exterior is coupled to the base end of the rod, and an end nut is threadably coupled to the tip end of the rod. The end nut further includes a pivotable handle for allowing loosening in one orientation and tightening in another orientation. When a fork of a bicycle is disposed on the base end and tip end of the rod, and when the adjusting nut and end nut are tightened against the fork, the fork is secured about the T-shaped nut, thus placing the fork in a fixed position for enabling transport of the associated bicycle from one location to another.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle rack for a pickup truck which has all the advantages of the prior art bicycle racks and none of the disadvantages.

It is another object of the present invention to provide a new and improved bicycle rack for a pickup truck which may be easily and efficiently manufactured and marketed.

It is a further object of the present invention to provide a new and improved bicycle rack for a pickup truck which is of durable and reliable construction.

An even further object of the present invention is to provide a new and improved bicycle rack for a pickup truck which is susceptible of a low cost of manufacture with regard to both materials and labor, and which accordingly is then susceptible of low prices of sale to the consuming public, thereby making such a bicycle rack for a pickup truck economically available to the buying public.

Still yet another object of the present invention is to provide a new and improved bicycle rack for a pickup truck which provides in the apparatuses and methods of the prior art some of the advantages thereof, while simultaneously overcoming some of the disadvantages normally associated therewith.

Even still another object of the present invention is to provide a new and improved bicycle rack for a pickup truck for securing bicycles in a fixed position in a bed of a pickup truck for transport from one location to another.

Lastly, it is an object of the present invention to provide a new and improved bicycle rack for a pickup truck comprising an upwardly extended and telescopically adjustable base tube having a lower end and an open upper end; coupling means for coupling the base tube to a bed of a pickup truck; a bicycle handle bar having two free ends; a bicycle handle bar stem having an upper end coupled to the bicycle handle bar between the free ends and a lower end coupled within the upper end of the base tube; and securement means coupled to the free ends of the bicycle handle bar and adapted for securing forks of a pair of bicycles thereto, thus placing the forks in a fixed position for enabling transport of the bicycles from one location to another.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
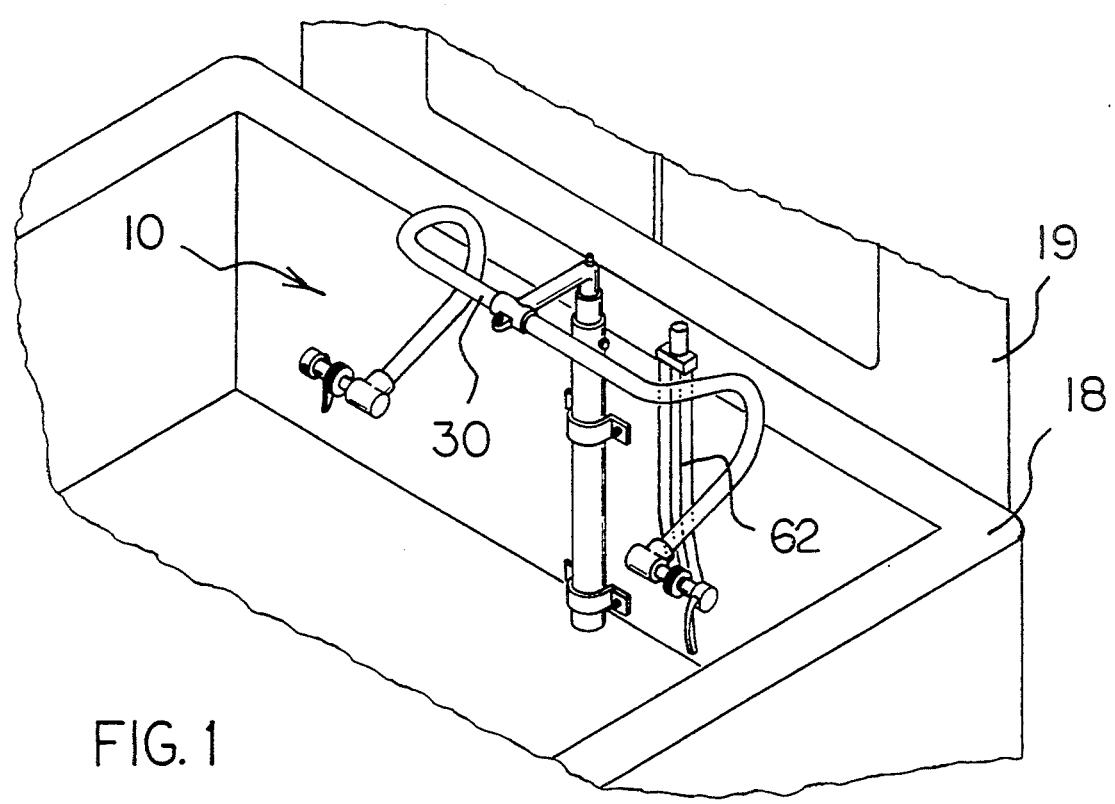
FIG. 1 is a perspective view of the preferred embodiment constructed in accordance with the principles of the present invention secured within a bed of a pickup truck at a location near its passenger cab for holding bicycles.
Figure 2:
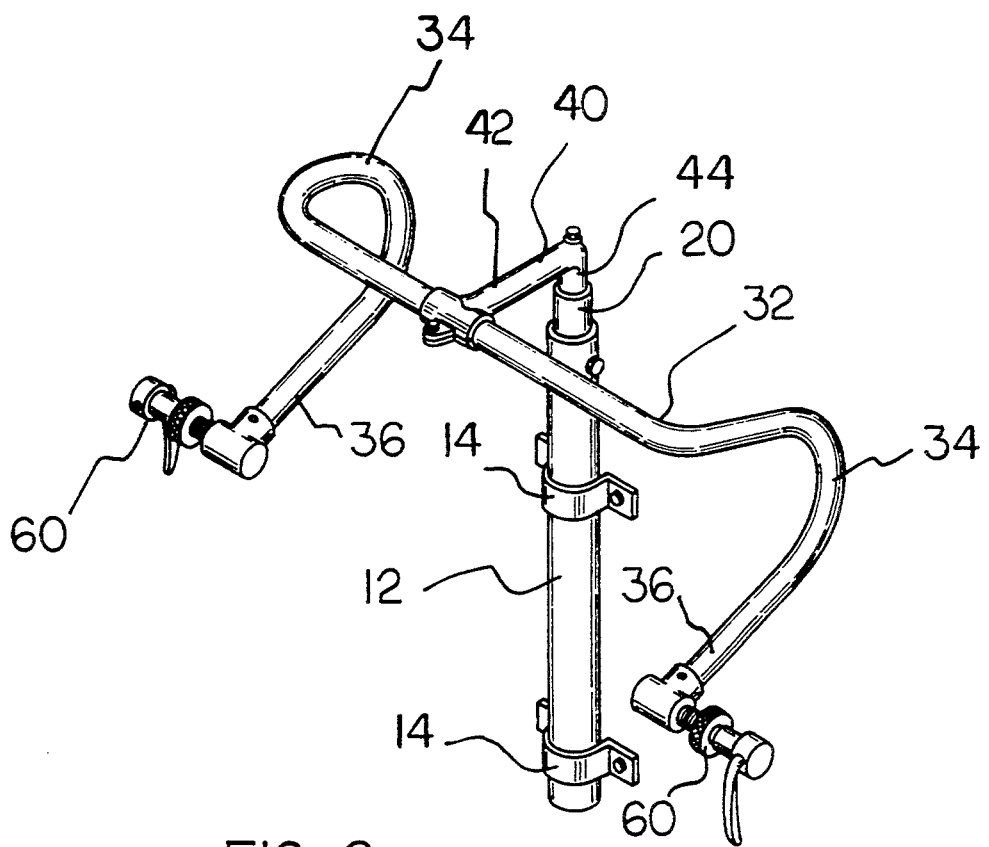
FIG. 2 is a perspective view of the preferred embodiment of the present invention removed from a bed of a pickup truck.
Figure 3:
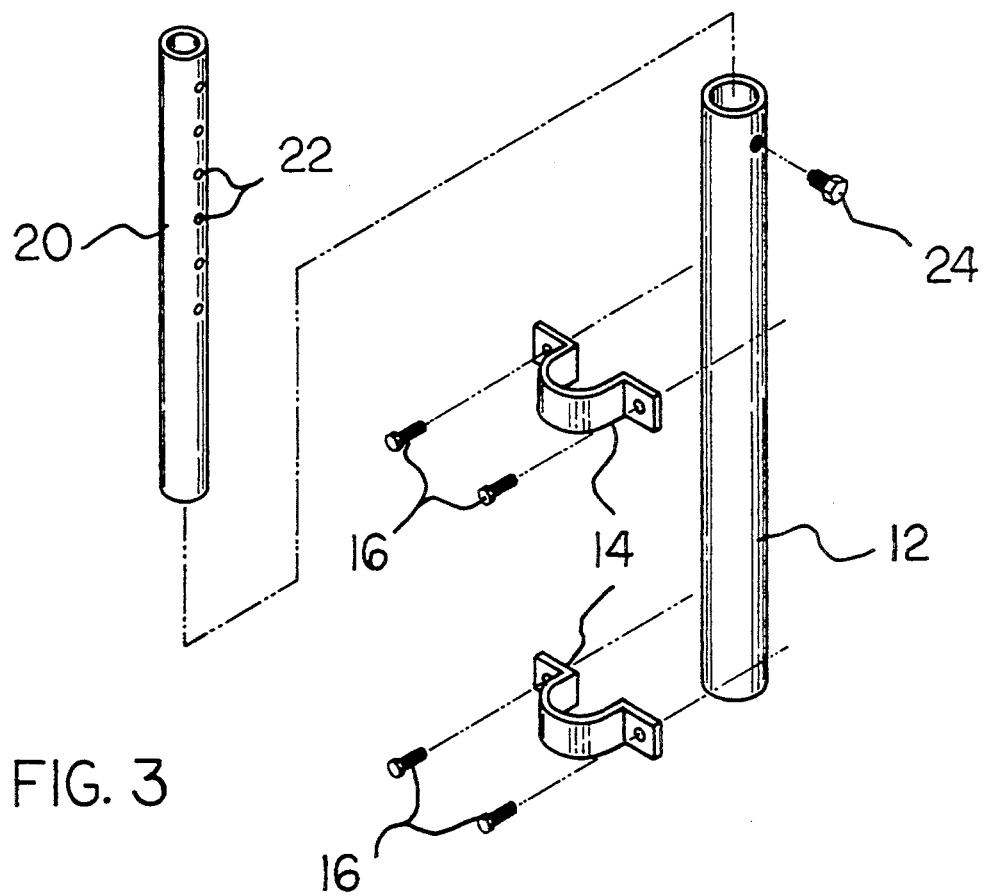
FIG. 3 is an exploded perspective view of the base tube, the extension tube, and the clamps of the present invention.
Figure 4:
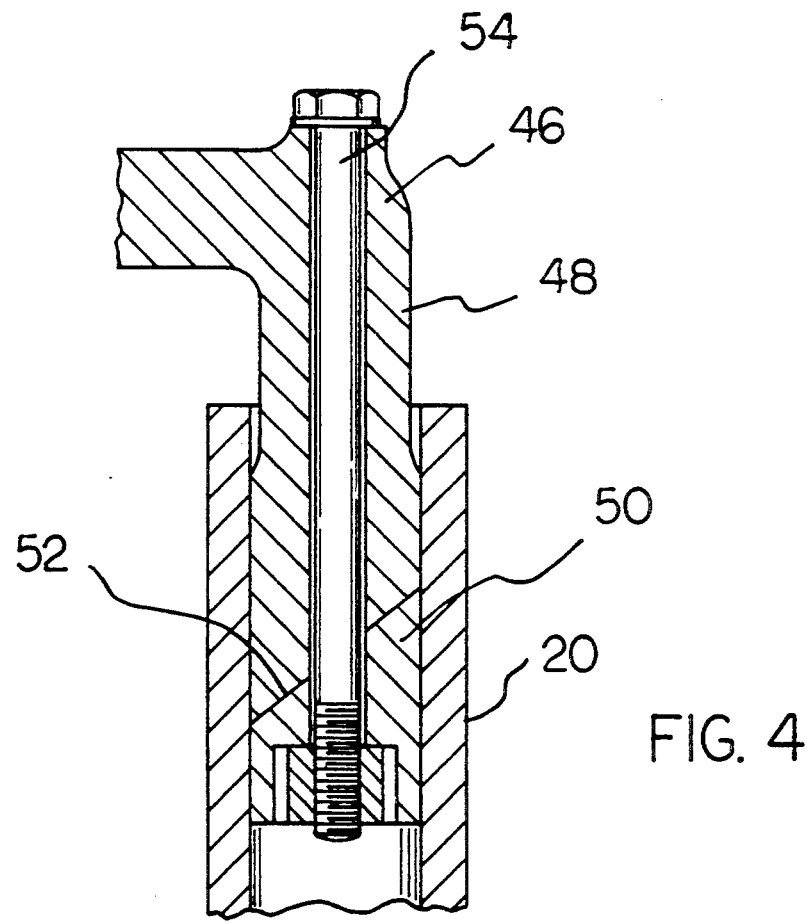
FIG. 4 is a cross-sectional view of the coupling between the bicycle handle bar stem and the extension tube of the present invention.
Figure 5:
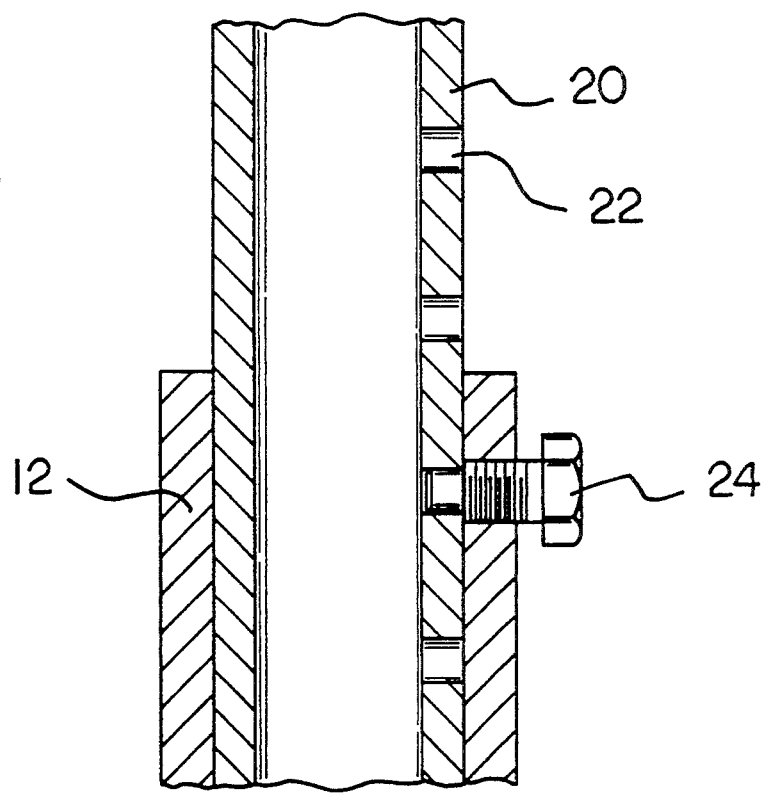
FIG. 5 is a cross-sectional view of the telescopic coupling between the base tube and the extension tube of the present invention.
Figure 6:
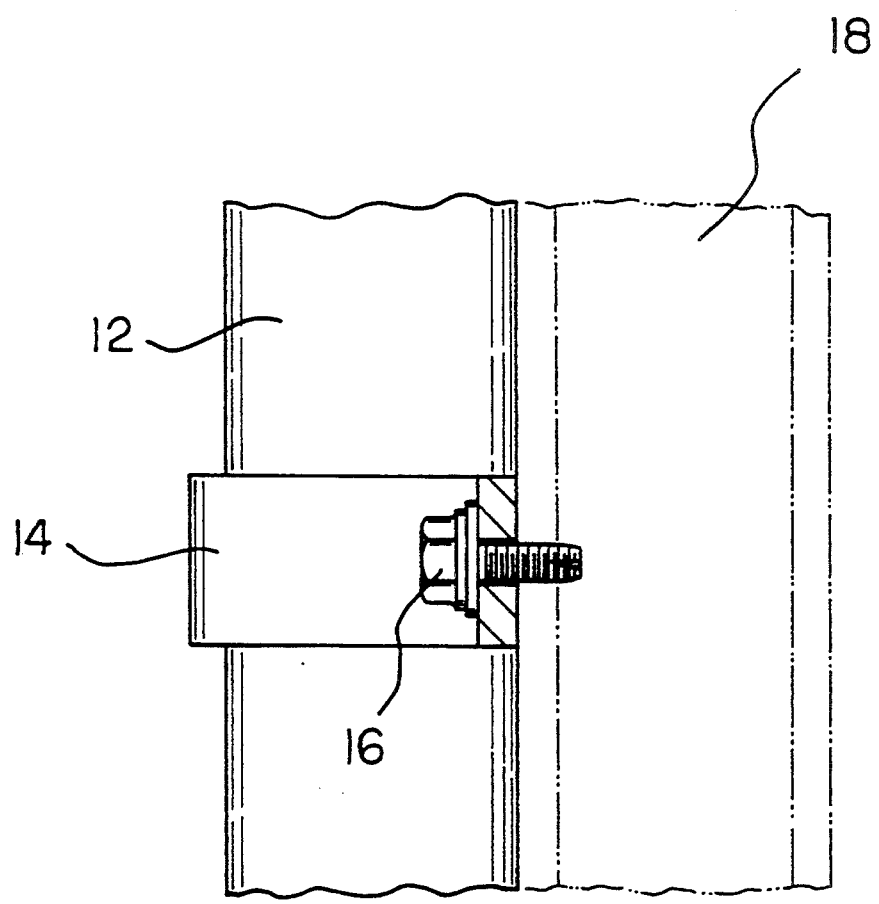
FIG. 6 is an enlarged side-elevational view of the coupling of the base tube and a clamp of the present invention with a bed of a pickup truck.
Figure 7:
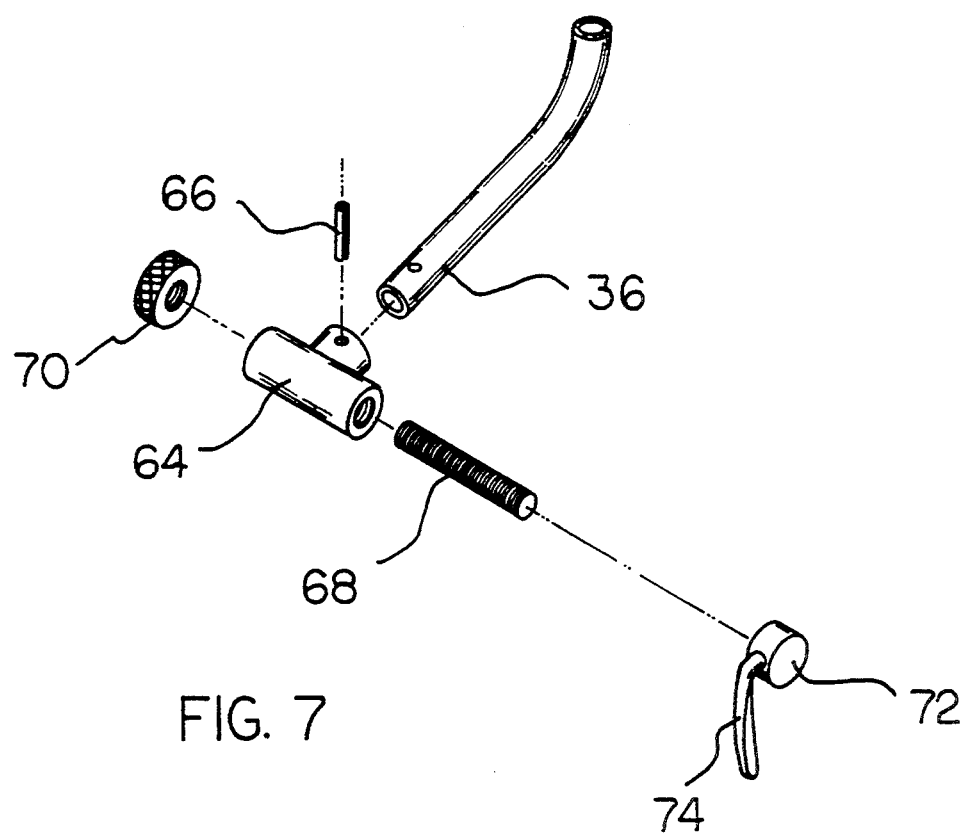
FIG. 7 is an exploded perspective view of the coupling of a securement bolt to a free end of a handle of the present invention.
Figure 8:
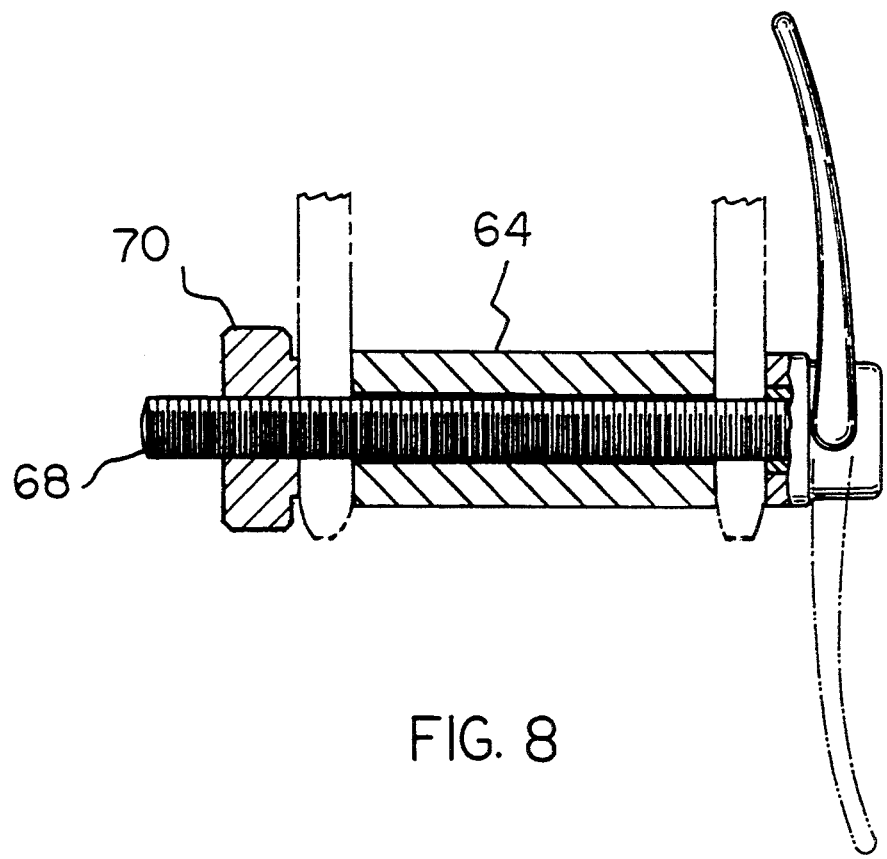
FIG. 8 is a cross-sectional view of the coupling a securement bolt of the present invention with a fork of a bicycle.

With reference now to the drawings, and in particular, to FIG. 1 thereof, the preferred embodiment of the new and improved bicycle rack for a pickup truck embodying the principles and concepts of the present invention and generally designated by the reference number 10 will be described.

Specifically, the present invention includes seven major components. The major components are the base tube, clamps, extension tube, height adjustment bolt, bicycle handle bar, bicycle handle bar stem, and securement bolts. These components are interrelated to provide the intended function.

More specifically, it will be noted in the various Figures that the first major component is the base tube 12. The base tube is rigid and elongated in structure. It has a lower end, an open upper end, and an intermediate portion therebetween. The base tube serves as the main support for the other components of the present invention.

The second major component is the clamps 14. The present invention includes a pair of clamps. The clamps are rigid in structure. They are adapted to be positioned about the base tube in a spaced configuration. Each clamp has an elongated and U-shaped interior portion. This interior portion is disposed around the base tube.

The clamp also includes a pair of opposed lips coupled to opposite ends of the interior portion. These lips are adapted to receive screws 16 for enabling the clamp and base tube 12 to be secured to a bed 18 of a pickup truck near its passenger cab 19. The clamps are used to secure the base tube in a near vertical orientation.

The third major component is the extension tube 20. The extension tube is rigid and elongated in structure. It has a lower end, an open upper end, and an intermediate portion therebetween. A plurality of spaced adjustment holes 22 are disposed on the intermediate portion in a linear configuration. These adjustment holes are aligned with the central axis of the extension tube. The lower end of the extension tube is slidably disposed in the upper end of the base tube 12. Thus, the extension tube may be telescopically adjusted in relation to the base tube.

The fourth major component is the height adjustment bolt 24. The height adjustment bolt is threaded in structure. It is removably extended through the upper end of the base tube 12 through a threaded hole located near the upper end thereof and then secured within an adjustment hole of the extension tube 20. The height adjustment bolt allows the projection of the upper end of the extension tube from the lower end of the extension tube to be adjustably set.

The fifth major component is the bicycle handle bar 30. The bicycle handle bar is rigid and tubular in structure. The bicycle handle bar is formed in a shape like those used with conventional 10-speed bicycles. The bicycle handle bar has a generally horizontally positioned and linear cross leg 32. The bicycle handle bar also includes a pair of spaced and generally U-shaped handles 34. Each handle has an upper end coupled to an end of the cross leg and a lower end 36 extended downward to a position below the cross leg. The bicycle handle bar in combination with the extension tube and base tube serve as a support for holding a bicycle.

The sixth major component is the bicycle handle bar stem 40. The bicycle handle bar stem is rigid in structure. It has a generally horizontal upper leg 42 coupled to the bicycle handle bar at the midpoint of the cross leg thereof. The bicycle handle bar stem has a generally vertical lower leg 44 slidably disposed within the upper end of the extension tube. A generally perpendicular bend 46 is formed between the upper leg and the lower leg. The lower leg further includes a bored upper section 48 and a threaded bored lower section 50. Both the upper bored section and the threaded bored lower section are mated at an angular juncture 52. The bicycle handle bar stem includes a threaded stem bolt 54. The stem bolt is extended downward through the bores of the upper and lower section from a location at the bend and then threadably coupled with the lower section. By tightening the stem bolt, the lower section moves upwards along the angular juncture, thereby abuttedly coupling the bicycle handle bar stem with the extension tube 20. By loosening the stem bolt, the lower section moves downwards along the angular juncture, thereby decoupling the bicycle handle bar stem from the extension tube.

The seventh major component is the securement bolts 60. The present invention includes a pair of securement bolts. The securement bolts are rigid in structure. Each securement bolt is adapted for securably holding a fork 62 of a bicycle to a handle of the handlebar. Each securement bolt has a T-shaped nut 64. The T-shaped nut has a generally horizontal and threaded bored cross leg and an upwardly extended and bored base leg. The base leg is coupled to a free end of a bicycle handle bar with a slotted spring pin 66. Each securement bolt also includes a threaded rod 68. The threaded rod is disposed within the bore of the cross leg and has a base end and a tip end are extended therefrom. Each securement bolt also includes an adjusting nut 70. The adjusting nut has a threaded interior coupled to the base end of the rod and a knurled exterior for allowing a user a firm grip for loosening or tightening. Each securement bolt also includes an end nut 72. The end nut is threadably coupled to the tip end of the rod. Each end nut further includes a pivotable handle 74 extended therefrom. The pivotable handle enables a user to readily loosen or tighten the end nut. When a fork of a bicycle is disposed on the base end and tip end of the rod, and when the adjusting nut and end nut are tightened against the fork, the fork is secured about the T-shaped nut with the associated bicycle handle 34 projected through the fork. Thus, through use of the securement bolts, the fork is placed in a fixed position for enabling transport of the bicycle from one location to another. Furthermore, through relative positioning of the fork about an associated bicycle handle, less torque is produced by the weight of the bicycle during transport in the fixed position.

The present invention is a bicycle rack for use in pickup trucks. The present invention is made of metal or other such rigid material. The bicycle rack is secured to the bed of a pickup truck with a base tube about 1" wide by about 15–18" long. The base tube is fastened to the bed of a pickup truck with self-drilling screws. The bicycle handle bar with bicycle handle bar stem is slid into the extension tube and secured thereto through tightening the stem bolt using a 6 mm hex wrench. On the two free ends of the bicycle handle bar is where the bikes are attached. This is done by coupling a T-shaped nut to a free end of the handlebar, and then securing it to the handlebar with a pin. A $\frac{1}{2}$" end nut and adjusting nut are threadably coupled to each end of the $\frac{3}{8}$" rod, and a quick-release spacer is placed on the rod to provide a mock axle for clamping the fork of a bicycle to. Each spacer is no more than 4" in length. Each spacer is placed on the rod such that about $2\frac{3}{4}$" of the rod is projected therefrom at a location remote from the handlebar. The present can hold two bikes at one time with one bicycle positioned near each handle of the bicycle handle bar. The present invention be removed from a truck when not in use. The main advantage this bicycle rack has over existing prior art bicycle truck racks is the fact that conventional and commercially available bicycle parts may be used in lieu of the major components set forth hereinabove. Therefore the present invention can be produced cheaply.

For most applications, simple clamps are used to secure the base pipe to the bed of a pickup truck, by drilling permanent holes into the side of the box. This may not appeal to some. An optional collar can be made, using a piece of tube slightly larger than 1" (inner diameter), to be placed at over the upper end of the base tube. This collar has two clamps coupled thereto that can be attached to a top flange of a pickup truck bed. A set screw is placed in this collar and abutted against the base tube to keep the base tube from rattling when placed therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A bicycle rack for securing bicycles in a fixed position in a bed of a pickup truck for allowing transport from one location to another comprising, in combination:

a rigid and elongated base tube having a lower end, an open upper end, and an intermediate portion therebetween;

a pair of rigid and spaced clamps having an elongated and U-shaped interior portion disposed around the base tube and a pair of opposed lips coupled to opposite ends of the interior portion for enabling the clamp and base tube to be secured to a bed of a pickup truck;

a rigid and elongated extension tube having a lower end, an open upper end, an intermediate portion therebetween, and a plurality of spaced adjustment holes disposed thereon in a linear configuration aligned with a central axis thereof, the lower end of the extension tube slidably disposed in the upper end of the base tube;

a height adjustment bolt removably extended through the upper end of the base tube and slidably secured within one of said adjustment holes of the extension tube, thereby allowing an adjustable projection of the upper end of extension tube relative to the lower end of base tube;

a rigid and tubular bicycle handle bar having a generally horizontally positioned and linear cross leg having opposing ends and a pair of spaced and generally U-shaped handles, each of said U-shaped handles having an upper end coupled to the opposing ends of said cross leg, respectively, and a lower free end positioned therebelow;

a rigid bicycle handle bar stem having a generally horizontal upper leg coupled to the bicycle handle bar at a midpoint of the cross leg thereof, a generally vertical lower leg slidably disposed within the upper end of the extension tube, and a generally perpendicular bend therebetween connecting said upper and lower legs, the lower leg further having an upper bored section and a lower threaded bored section mated at an angular juncture with said upper section and a threaded stem bolt disposed through the bores and threadably coupled with the lower section, whereby tightening the stem bolt causes the lower section to move upward along the angular juncture, thereby abuttedly coupling the bicycle handle bar stem with the extension tube, and loosening the stem bolt causes the lower section to move downward along the angular juncture, thereby decoupling the bicycle handle bar stem from the extension tube;

a pair of rigid securement bolts with each securement bolt adapted for securing a fork of a bicycle to the bicycle handle bar, each securement bolt having a T-shaped nut with a generally horizontal bored cross leg and an upwardly extended bored base leg coupled to the free ends of the handle handle bar, a threaded rod disposed within the bore of the cross leg and having a base end and a tip end extended therefrom, an adjusting nut having a threaded interior and a knurled exterior coupled to the base end of the rod, and an end nut threadably coupled to the tip end of the rod and further having a pivotable handle connected thereto for allowing loosening in one orientation and tightening in another orientation, whereby when the fork of the bicycle is disposed on the base end and tip end of the rod of one of the securement bolts, and when the adjusting nut and end nut are tightened against the fork, the fork is secured about the T-shaped nut, thus placing the fork in a fixed position for enabling transport of the associated bicycle from one location to another.

2. A bicycle rack for securing bicycles in a fixed position in a bed of a pickup truck comprising:

an upwardly extended and telescopically adjustable base tube having a lower end and an open upper end;

coupling means for coupling the base tube to a bed of a pickup truck;

a bicycle handle bar having two free ends;

a bicycle handle bar stem having an upper end coupled to the bicycle handle bar between the free ends and a lower end coupled within the upper end of the base tube; and securement means coupled to each of the free ends of the bicycle handle bar and each adapted to clamp lower ends of fork of a bicycle therein, thus placing the forks in a fixed position for enabling transport of bicycles from one location to another.

3. The bicycle rack as set forth in claim 2 wherein the bicycle handle bar comprises a generally horizontally positioned and linear cross leg having opposing ends and a pair of spaced and generally U-shaped handles, each of said U-shaped handles having an upper end coupled to the opposing ends of said cross leg, respectively, and a lower free end positioned therebelow.

4. The bicycle rack as set forth in claim 2 wherein the securement means is a pair of securement bolts with each securement bolt adapted for securably holding the fork of the bicycle, each securement bolt having a T-shaped nut having a generally horizontal and threaded bored cross leg and an upwardly extended and bored base leg coupled to the free ends of the bicycle handle bar, respectively an adjusting nut having a threaded interior, a threaded rod having a base end, a tip end, and an intermediate portion therebetween with the intermediate portion of the rod threadably coupled to the cross leg of the T-shaped nut and the adjusting nut threadably disposed about the base end of the rod, a end nut threadably coupled to the tip end of the rod with the end nut having a handle pivotally coupled thereto and with the handle having one orientation for allowing movement of the end nut and another orientation for preventing such movement, whereby when the fork of the bicycle is disposed on the threaded rod, and when the adjusting nut and end nut are tightened against the fork, the fork is secured between the cross leg and each of the nuts, thus placing it in a fixed position for enabling transport of the bicycle from one location to another.

* * * * *